United States Patent [19]

Uhlig

[11] 3,759,410
[45] Sept. 18, 1973

[54] PRESSURE RESISTANT PLASTIC CONTAINER

[75] Inventor: Albert R. Uhlig, Toledo, Ohio
[73] Assignee: Owens-Illinois, Inc., Toledo, Ohio
[22] Filed: Dec. 15, 1971
[21] Appl. No.: 208,244

[52] U.S. Cl. .................................. 215/1 C, 150/.5
[51] Int. Cl. ............................................. B65d 1/02
[58] Field of Search ...................... 215/1 C; 150/.5; 220/70

[56] References Cited
UNITED STATES PATENTS
3,598,270  8/1971  Adomaitis ......................... 215/1 C
2,541,065  2/1951  Jabour .......................... 215/1 C UX
3,043,461  7/1962  Glassco ............................. 215/1 C
3,403,804  10/1968  Colombo .......................... 150/.5 X

*Primary Examiner*—Donald F. Norton
*Attorney*—Philip M. Rice et al.

[57] ABSTRACT

A plastic container having a configuration designed to package goods capable of generating internal pressure is provided. The container has a circular cross-sectional configuration with side walls following a generally outwardly convex arcuate path from the upper mouth portion toward the base at the lower end. The base is provided with three bulbous feet extending downwardly from a generally rounded bottom portion for supporting the container in an upright position.

2 Claims, 5 Drawing Figures

PATENTED SEP 18 1973 3,759,410

INVENTOR.
ALBERT R. UHLIG
BY Philip M. Rice
& E. J. Holler
ATTORNEYS

INVENTOR.
ALBERT R. UHLIG
BY Philip M. Rice
& E. J. Holler
ATTORNEYS

PRESSURE RESISTANT PLASTIC CONTAINER

BACKGROUND OF THE INVENTION

In the field of plastic containers, it has long been desirable to provide a container capable of withstanding beer, carbonated beverages, or other goods which generate a substantial internal pressure. Plastic bottles for packaging such pressure generating goods have not made a great impact on the market because, until recently, there has not been available plastic materials capable of withstanding the pressures generated in the containers. However, new plastic resins such as Lopac manufactured by Monsanto Co., St. Louis, Mo., and Barex marketed by Standard Oil Co. of Ohio, Cleveland, Ohio through its Vistron Division, along with improved techniques of processing older materials such as polyvinyl chloride and polypropylene wherein a parison is expanded into the finished article while the plastic material is at the orientation temperature for the specific material, have increased the likelihood of gaining wide-spread acceptance of plastic containers for containing such products. A process for forming plastic containers at the orientation temperature of the plastic material is disclosed in U.S. Pat. No. 3,470,282 which is assigned to the assignee of the present invention.

Despite the introduction of such materials and methods of processing, it is necessary to also provide a container design or shape which can most effectively resist the internal pressures generated without rupturing or becoming unduly distorted.

Accordingly, it is an object of the present invention to provide a plastic container having a configuration ideally suited for holding goods which generate internal pressure.

The prior art plastic bottles and containers for containing beer or other goods under pressure have been deficient in one or more design features. For example, some containers have abrupt changes in configuration. The areas of such abrupt changes are stress concentration points which are inherently weak. Other prior art containers are provided with bottom portions which, upon a slight bulging due to the internal pressure, no longer have all points lying in the same plane and thus are unstable when resting on a flat table. Containers suffering from such defects are referred to as having rocker bottoms.

Accordingly, another object of the present invention is to provide a container having a tripod base formed of three bulbous feet depending downwardly from a rounded bottom to provide three point support. Inasmuch as three points define a plane, the bottom rests firmly in an upright position both before and after it is subjected to internal pressure. Furthermore, the fact that the feet are rounded and bulbous with no abrupt changes of configuration, results in a substantially uniform change of configuration when the container is subject to internal pressure. Accordingly, in addition to resting firmly, the container will stand with its longitudinal axis perpendicular to the support upon which it is resting, assuming, of course, that the original manufacture resulted in the unpressurized container standing perpendicular to such support.

Referring now to the drawings.

Figure 1:
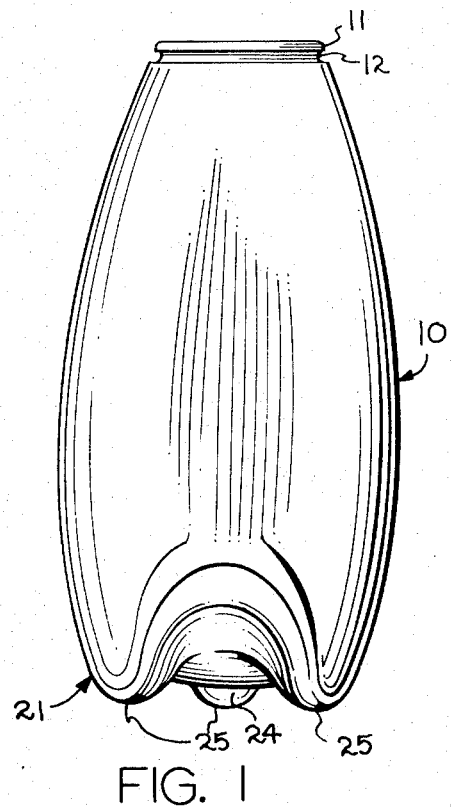
FIG. 1 is an elevational view of the container of my invention.
Figure 2:
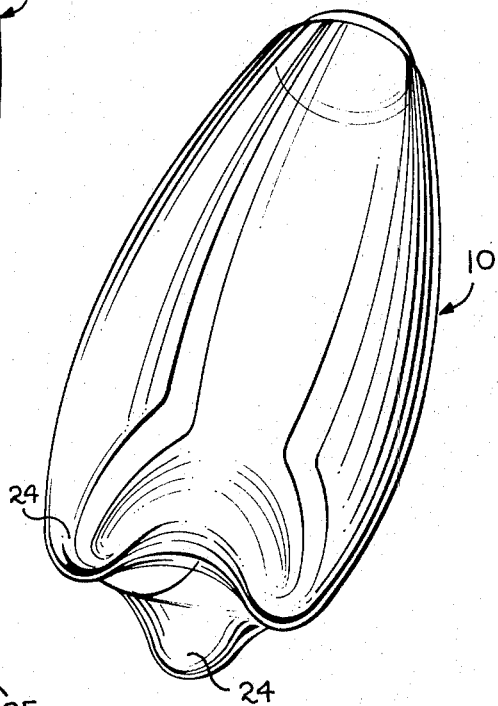
FIG. 2 is a perspective view showing the container tilted so that both the bottom and the side wall portions can be seen.

Referring to the drawings, the container 10 comprises an upper neck or finish portion 11 having immediately therebeneath an annular groove 12 for receiving and retaining a closure. For example, as may be seen in FIG. 4, a metal closure 15 having a depending skirt 16 with an inwardly crimped flange 17 engaging the annular groove 12, may be provided.

Figures 4, 5:
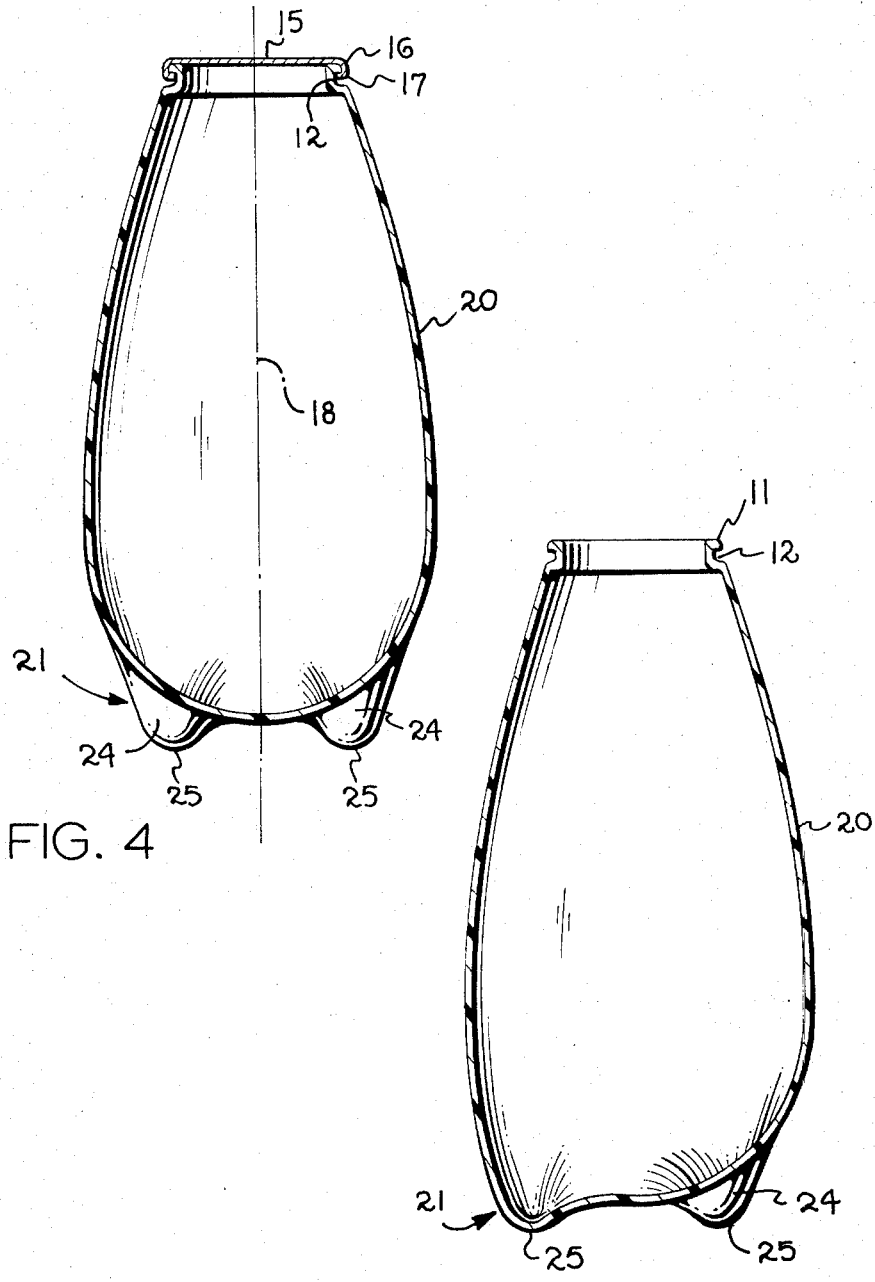
FIG. 4 is a sectional view taken through line 4—4 of FIG. 3, showing the container with a closure affixed thereto.
FIG. 5 is a sectional view taken through line 5—5 of FIG. 3.

Extending downwardly from the neck portion is a body portion 20 which follows a smooth outwardly extending arcuate path from the neck portion to the base which is designated generally by the numeral 21. The body portion 20 preferably has a circular cross-sectional configuration taken through a plane perpendicular to the longitudinal axis 18 (FIG. 4). The body portion, by virtue of its circular cross sectional configuration and bulged contour which follows, in longitudinal cross section, a smooth arcuate outwardly convex path, provides maximum resistance to distortion from internal pressures generated within the container. Furthermore, that distortion which does occur will be substantially uniform and, hence, will not be readily apparent from viewing the container.

The base portion 21 of the container is preferably integrally formed with the body portion 20 by conventional blow molding techniques. For example, the container may be formed by a process under which a length of tubing is extruded and enclosed within the halves of a partible blow mold and thereafter expanded in such mold. One such process is described in U.S. Pat. RE 25,290. Under such process, the end of the tube which subsequently forms the bottom portion 21 of the bottle 10 is pinched together and sealed upon closing of the mold halves. Such pinching leaves a weld or scar line which is illustrated by the numeral 23 in FIG. 3.

It should be understood, however, that other processes of blow molding may be utilized which will permit the bottom portion to be formed without the presence of a pinch off or scar line 23. One method of blow molding a container without a pinch off or scar line is known as injection blow molding wherein a parison is injection molded so that one end is closed. Such parison is then transferred to a blow mold where it is expanded to the desired container configuration. One such method is described in U.S. Pat. No. 3,357,045.

Irrespective of what method of blow molding is used to form the container 10 of the present invention, the bottom portion 21 has formed therein three bulbous feet 24, the lower ends 25 of which define a plane which is perpendicular to the longitudinal axis 18 of the container 10. Thus, the container 10, when in an upright position, rests on the lower ends 25 of the feet 24. By virtue of the fact that exactly three feet 24 are provided, and three points, by geometric definition, define a plane, the container 10 is at all times assured of resting in a stable position. Thus, if more than three feet are provided, there is always a possibility that one will lie out of the plane defined by any three of the others. When this happens, the container is unstable and has what is known as a "rocker bottom." This is particularly significant for containers used to package goods under pressure such as beer or carbonated beverages as the pressure generated internally by the product causes some distortion to the plastic bottle. However, the present container 10 by virtue of its shape and the bottom portion configuration with three feet can be subjected to some such distortion without adverse effect to its appearance and more importantly to its stability.

Figure 3:
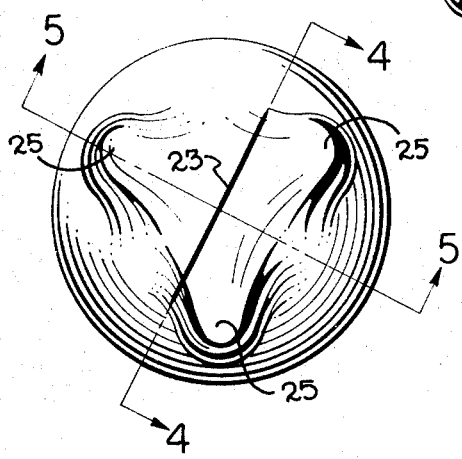
FIG. 3 is a bottom view thereof.

As can be seen from viewing FIG. 3, when the container 10 is formed by a process that leaves a weld line 23, it is preferred that the weld line 23 avoid passing through any of the feet 24 and that it pass through the longitudinal axis 18 following a path substantially parallel to any two of the lower ends 25. The reason for such positioning is the fact that a weld line 23 is a potential source of weakness and a seal formed at that location is stronger than a seal formed at other locations of the bottom such as the feet which tend to be somewhat thinner.

In comparing the container of the present invention with prior art containers, it is noted that U.S. Pat. No. 3,598,270 and French Pat. No. 1,493,309 disclose plastic containers having bottom end structures with four or six protrusions or feet portions. U. S. Pat. No. 3,514,812 shows a container having six ribs on which the bottle rests when in an upright position. U.S. Pat. No. 3,511,401 shows a bottle having an annular protrusion or bottom resting portion. The difficulty with containers having bottom configurations such as these is that even though the bottom resting portion of the container may have been perfectly planar when the container was initially blow molded, the packaging of a product under pressure therein will frequently distort the container unevenly. Thus, all portions of the container are not of precisely the same tensile strength. This may be caused in large measure by the fact that the container will have some portions which are slightly thinner in wall thickness than other portions. As a result, such portions tend to be stretched to a greater degree than other portions. Such stretching to a greater degree, when occurring at the bottom of prior art containers, results in the bottoms no longer being planar, thus resulting in the rocker bottoms.

It may be readily seen, that the container of the present invention, by virtue of utilizing three feet which by geometric definition at all times define a plane, insures that the container will be stable even though some portions may have expanded slightly more than others. Furthermore, by virtue of the rounded bulbous configuration of the feet, the container has an inherently better chance of expanding uniformly upon the generation of pressure internally by goods contained therein. Such uniform expansion, although slight, nevertheless insures that the container will rest upright substantially perpendicular to the support upon which it is positioned. Finally, for those containers formed with a weld line in the bottom, the weld line is positioned in an area most likely to withstand the internal pressure without failing.

I claim:

1. A plastic container comprising a finish defining an opening for receiving and dispensing contents, a body extending downwardly from said finish to a base for resting on a support, said body having a circular cross sectional configuration taken through a plane perpendicular to the longitudinal axis thereof and following a smooth outwardly convex path in longitudinal section, said base having a generally rounded bottom with a weld line extending through said longitudinal axis, and three equally spaced apart bulbous feet extending downwardly from said base, said feet being positioned so that two are parallel to and spaced apart from said weld line and the third is on the opposite side of said weld line from the other two.

2. A plastic container comprising a body portion having a circular cross sectional configuration taken through a plane perpendicular to the longitudinal axis thereof, said body portion extending from an upper mouth portion to a lower base portion which supports the container in an upright position, said body in vertical section following an outwardly convex arcuate path merging into said base, said base having a generally rounded bottom and three equally spaced apart bulbous feet extending downwardly from said base for supporting said container in an upright position, the lowermost portions of the respective feet being rounded and defining a plane substantially perpendicular to said longitudinal axis.

* * * * *